April 10, 1956     G. W. HAZZARD     2,741,400

JUICE DISPLAY FOUNTAIN

Filed April 9, 1953

George W. Hazzard
INVENTOR.

United States Patent Office 2,741,400
Patented Apr. 10, 1956

2,741,400

JUICE DISPLAY FOUNTAIN

George W. Hazzard, Palm Harbor, Fla.

Application April 9, 1953, Serial No. 347,727

1 Claim. (Cl. 222—130)

This invention relates to a display apparatus and more particularly to a device for displaying and dispensing beverages such as juices of various fruits and vegetables.

The primary object of this invention is to display, advertise, and promote the sale of fruit and vegetable juices.

This invention contemplates the employment of a housing constituting one of the important elements of the invention which is configurated to simulate the shape of any suitable fruit or vegetable such as orange, grapefruit, lemon, lime, tangerine, papaya, apple, pineapple, grape, tomato, cabbage, carrots or the like so as to be highly attractive in appearance and to be indicative of the juices to be dispensed therefrom whereby a potential customer will be attracted and intrigued by the novel and pleasing appearance of the display device thus effectively increasing the sale of the particular juice or beverage contained therein.

A further object of this invention resides in the provision of a transparent casing supported by the housing which has means associated therewith to continuously provide a fountain-like exudation of liquid contained therein whereby due to the appealing effect achieved the sale of fruit and vegetable juices will be successfully promoted and increased.

This device is constructed to be adapted to seat on retail counters of drug stores, restaurants, and other suitable commercial establishments where a patron would usually enter to obtain refreshment.

Still further objects and features of the invention reside in the provision of a juice display and dispensing apparatus that is strong and durable, simple in construction and manufacture, capable of containing and chilling juices of various fruits and vegetables to a desired temperature and which is relatively inexpensive to manufacture.

Figure 1:
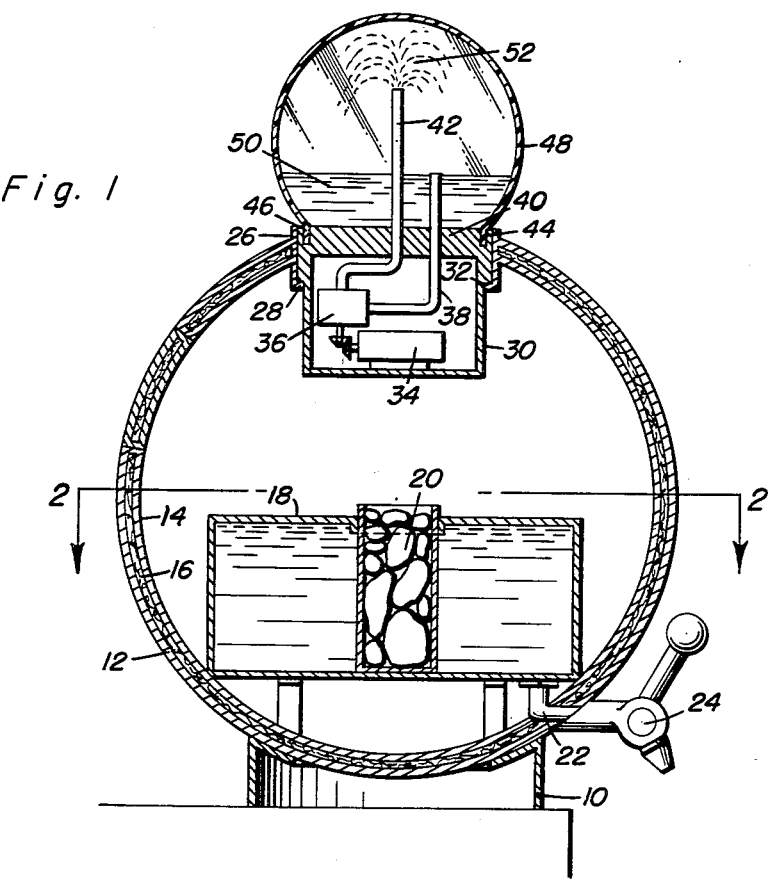
Figure 2:
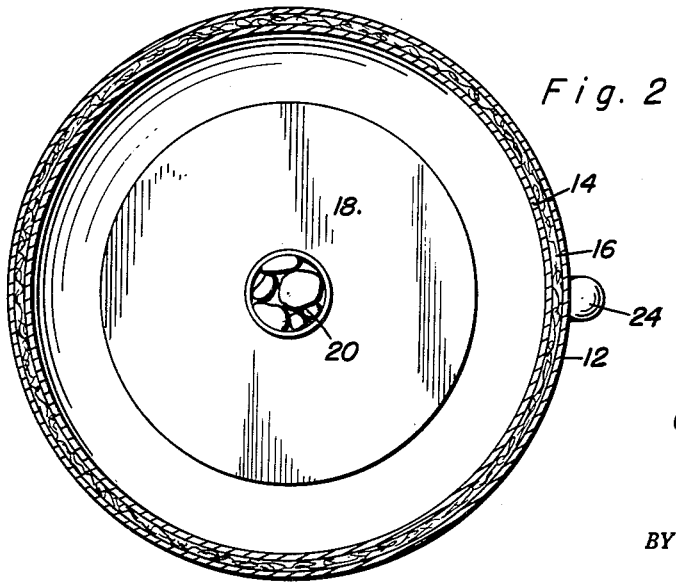

These, together with the various ancillary objects and features of the invention will become apparent as the following description proceeds, are attained by this display apparatus, a preferred embodiment of which has been illustrated in the accompanying drawings, by way of example, wherein:

Figure 1 is a vertical sectional view of a device constructed in accordance with the concepts of the present invention; and Figure 2 is a horizontal view as taken along the plane of line 2—2 in Figure 1.

With continuing reference to the accompanying drawings wherein like reference numerals designate similar parts throughout the various views, reference numeral 10 designates a stand of suitable configuration in which an outer housing 12 is adapted to be positioned and supported. The outer housing 12 is configurated to conform to the contours of any well known fruit, vegetable, or other desired edible, being shown in the drawings in simulation of an orange. This outer casing 12 is painted and otherwise treated so as to correspond to the coloring and other details of the fruit or edible which it simulates. An inner housing 14 is spaced from the outer housing 12 and may be formed of suitable structural materials as desired. Insulation 16 may be positioned between the inner housing 14 and the outer housing 12.

Supported within the housing 12 is a tank 18 which may be filled with the juice of the edible which the outer housing 12 simulates. A refrigerator or freezing box 20 is positioned centrally relative to the tank 18, the tank 18 thus surrounding and embracing the refrigerating means 20. This refrigerating means 20 may consist of an ice locker or may consist of suitable refrigerating coils. The tank 18 is connected through a suitable outlet conduit 22 to a spigot 24 which is adapted to be utilized in metering fluid from the tank 18.

The upper portions of the inner and outer housings 12 and 14 terminate in a cylindrical wall 26 which has preferably integrally formed at the bottom edge thereof a substantially horizontal flange 28. The flange 28 is adapted to support an enclosure 30 having a shoulder 32 formed along the side walls which is adapted to seat on the flange 28. Within the enclosure 30 there is provided a motor 34 which drives a pump 36. Connected to the pump 36 is an intake conduit 38 which extends upwardly therefrom and penetrates the top 40 of the enclosure 30. A delivery conduit 42 is likewise connected to the exhaust end of the pump 36 and extends upwardly beyond the upper and open end of the intake conduit 38. The top 40 of the enclosure 30 is provided with a preferably circular groove therein as at 44 for receiving the cylindrical flange 46 of a transparent casing 48. The casing 48 may be formed of glass or suitable transparent synthetic material. A seal is of course provided for the connection between the casing 48 and the top 40 of the enclosure 30. A suitable fluid corresponding in color and substance to the juice of the edible which the outer housing 12 represents is contained within the casing 48 as at 50. The top 40 of the enclosure 30 and the lower portions of the casing 48 form a reservoir for the fluid 50. The pump 36 will suck fluid in through the open end of the intake conduit 38 and discharge in a fountain-like spray as at 52 through the delivery conduit 42. This provides a highly attractive and intriguing display which in nature is refreshing to the potential customer and thus is adapted to promote the sale of the juice contained in the tank 18.

The device comprised in the present invention is adapted to be installed in the counters of restaurants, bars, soda fountains and the like and the juice is adapted to be poured into the tank 18 through any suitable port where it is maintained in a chilled and palatable condition. The fluid 50 may actually be the juice such as is contained within the tank 18 or may, if desired, in order to avoid the deleterious effects of actual juice on the pump and conduits resulting from the acid content thereof obviously suitable inspection and access plates can be provided for the enclosure 30.

Since from the foregoing, the construction and advantages of this display apparatus are readily apparent, further description is believed to be unnecessary.

However, since numerous modifications will readily occur to those skilled in the art after a consideration of the foregoing specification and accompanying drawings, it is not intended to limit the invention to the precise embodiments shown and described, but all suitable modifications and equivalents may be readily resorted to as desired.

What is claimed as new is as follows:

A juice display and dispensing apparatus comprising an outer housing configurated to simulate the contours of a selected edible, an inner housing inwardly spaced from said outer housing, insulative material between said inner housing and said outer housing, an enclosure seated in said inner housing, a transparent casing sealed to said enclosure and supported thereby, fountain means carried in said enclosure for directing fluid into said casing, refrigerating means in said inner housing, a tank for juice of said selected edible in said inner housing embracing said refrigerating means, and means extending through said inner and outer housings for metering fluid from said tank, said fountain means including a pump in said enclosure, an intake conduit open at its upper end communicating with said pump and extending upwardly into said casing, and a delivery conduit extending upwardly from said pump into said casing, said delivery conduit extending above said intake conduit, said casing serving as a reservoir with the level of the fluid therein corresponding to the height of the open end of said intake conduit.

References Cited in the file of this patent

UNITED STATES PATENTS

| | | |
|---|---|---|
| 1,487,816 | Sintzel | Mar. 25, 1924 |
| 1,536,188 | Brown | May 5, 1925 |
| 1,760,887 | Saugman | June 3, 1930 |
| 1,804,519 | Smith et al. | May 12, 1931 |
| 1,946,519 | Bemis | Feb. 13, 1934 |
| 2,577,849 | Henry | Dec. 11, 1951 |